(12) United States Patent
Kulkarni et al.

(10) Patent No.: US 7,933,679 B1
(45) Date of Patent: Apr. 26, 2011

(54) METHOD FOR ANALYZING AND OPTIMIZING A MACHINING PROCESS

(75) Inventors: Pravin Kulkarni, Wichita, KS (US); Dhananjay Joshi, Wichita, KS (US); Parag Konde, Wichita, KS (US); Amit Deshpande, Wichita, KS (US); Kareem Syed, Wichita, KS (US)

(73) Assignee: Cessna Aircraft Company, Wichita, KS (US)

( * ) Notice: Subject to any disclaimer, the term of this patent is extended or adjusted under 35 U.S.C. 154(b) by 351 days.

(21) Appl. No.: 12/256,257

(22) Filed: Oct. 22, 2008

Related U.S. Application Data

(60) Provisional application No. 60/982,027, filed on Oct. 23, 2007.

(51) Int. Cl.
*G06F 19/00* (2011.01)
(52) U.S. Cl. .............................. 700/173; 700/180; 703/2
(58) Field of Classification Search .................. 700/175, 700/172, 182, 180, 177, 173; 703/2, 56; 340/683; 73/579
See application file for complete search history.

(56) References Cited

U.S. PATENT DOCUMENTS

| | | | | |
|---|---|---|---|---|
| 5,377,116 | A * | 12/1994 | Wayne et al. ................. | 700/175 |
| 6,810,305 | B2 * | 10/2004 | Kirkpatrick, Jr. ............. | 700/245 |
| 2004/0193308 | A1 * | 9/2004 | Darcy et al. .................. | 700/182 |

OTHER PUBLICATIONS

Mackerle,Jaroslav, Finite-element analysis and simulation of machining, Jun. 26, 1999, Elsevier Sciences, p. 17-23.*
Albert J. Shih, Finite Element Analysis of the Rake Angle Effects in Orthogonal Metal Cutting, Jan. 27, 1995, Elsevier Science p. 1-17.*
Karpat, Yigit, et al. "Multi-Objective Optimization for Turning Processes Using Neural Network Modeling and Dynamic-Neighborhood Particle Swarm Optimization," Int. J. Adv. Manuf Technology, DOI 10.107/s00170-006-0719-8, 14 pages, Feb. 24, 2006.
Zuperl, Uros, et al. "Optimization of Cutting Conditions During Cutting by Using Neural Networks," Robotics and Compuer Integrated Manufacturing 19 (2003), pp. 189-199.

* cited by examiner

*Primary Examiner* — Kidest Bahta
(74) *Attorney, Agent, or Firm* — Lathrop & Gage LLP

(57) ABSTRACT

A method for optimizing machining parameters for a cutting process performed on a work piece. Finite element analysis of cutting tool and work material interaction is initially performed. Mechanistic modeling of the cutting process, using results of the finite element analysis, is then performed to provide optimized machining parameters for improved rate of material removal and tool life. Optionally, a two-stage artificial neural network may be supplementally employed, wherein a first stage of the network provides output parameters including peak tool temperature and cutting forces in X and Y directions, for a combination of input reference parameters including tool rake angle, material cutting speed, and feed rate.

14 Claims, 7 Drawing Sheets

METHOD FOR ANALYZING AND OPTIMIZING A MACHINING PROCESS

RELATED APPLICATION

This application claim priority to provisional Patent Application Ser. No. 60/982,027, filed Oct. 23, 2008, the disclosure of which is incorporated herein by reference.

TECHNICAL FIELD

This application relates to analysis of machining processes, including milling, drilling, turning and boring, using computer simulation and analysis techniques. More particularly, this invention relates to optimization of the above-mentioned machining processes by combining and analyzing results from finite element analysis, mechanistic modeling and vibration analysis of those processes.

PROBLEM AND SOLUTION

The traditional approach followed in selection of machining process parameters is a trial and error method based on machining handbooks and machinist's experience. This traditional approach of parameter selection is not specific to a particular machine tool and typically does not provide optimum utilization of cutting tool and machine tool capacity, which extends product manufacturing cycle time significantly. The present method involves machining process optimization using finite element analysis, mechanistic modeling and optional vibration analysis to overcome the disadvantages of the traditional approach. The present approach is economical, as the optimization process is carried out via computer simulation instead of in a machine shop, which eliminates need for time consuming shop trials and the cost of cutting tools and material. The data generated through the computer simulation is then validated in the machine shop and is documented in a structured database.

Machining process analyses are carried out using commercially available finite element analysis software, mechanistic process modeling software, and vibration analysis software and hardware in combination. The analyses reduce machining time, increase cutting tool life, improve productivity, improve part quality and optimize utilization of cutting tool and machine tool capacity. The present process combines the results of these analyses in order to determine optimum machining parameters. The output parameters of the simulation techniques include cutting forces, peak tool temperature and power consumption. Machining process parameters to be optimized using this methodology include cutting speed, feed rate, depth of cut and radial engagement of cutter. These analysis techniques result in optimization of the complete machining system, which includes cutting tool, work piece material, and machine tool. These simulation techniques and their combined application increase the understanding of the mechanics of machining processes and reduce the number of trial and error experiments.

SUMMARY

The present method provides optimized machining parameters for a cutting process performed on a work piece. Finite element analysis of cutting tool and work material interaction is initially performed. Mechanistic modeling of the cutting process, using results of the finite element analysis, is then performed to provide improved machining parameters for rate of material removal and tool life.

In an alternative embodiment, a two-stage artificial neural network may be supplementally employed, wherein a first stage of the network provides output parameters including peak tool temperature and cutting forces in X and Y directions, for a combination of input reference parameters including tool rake angle, material cutting speed, and feed rate.

DETAILED DESCRIPTION

Figure 1:
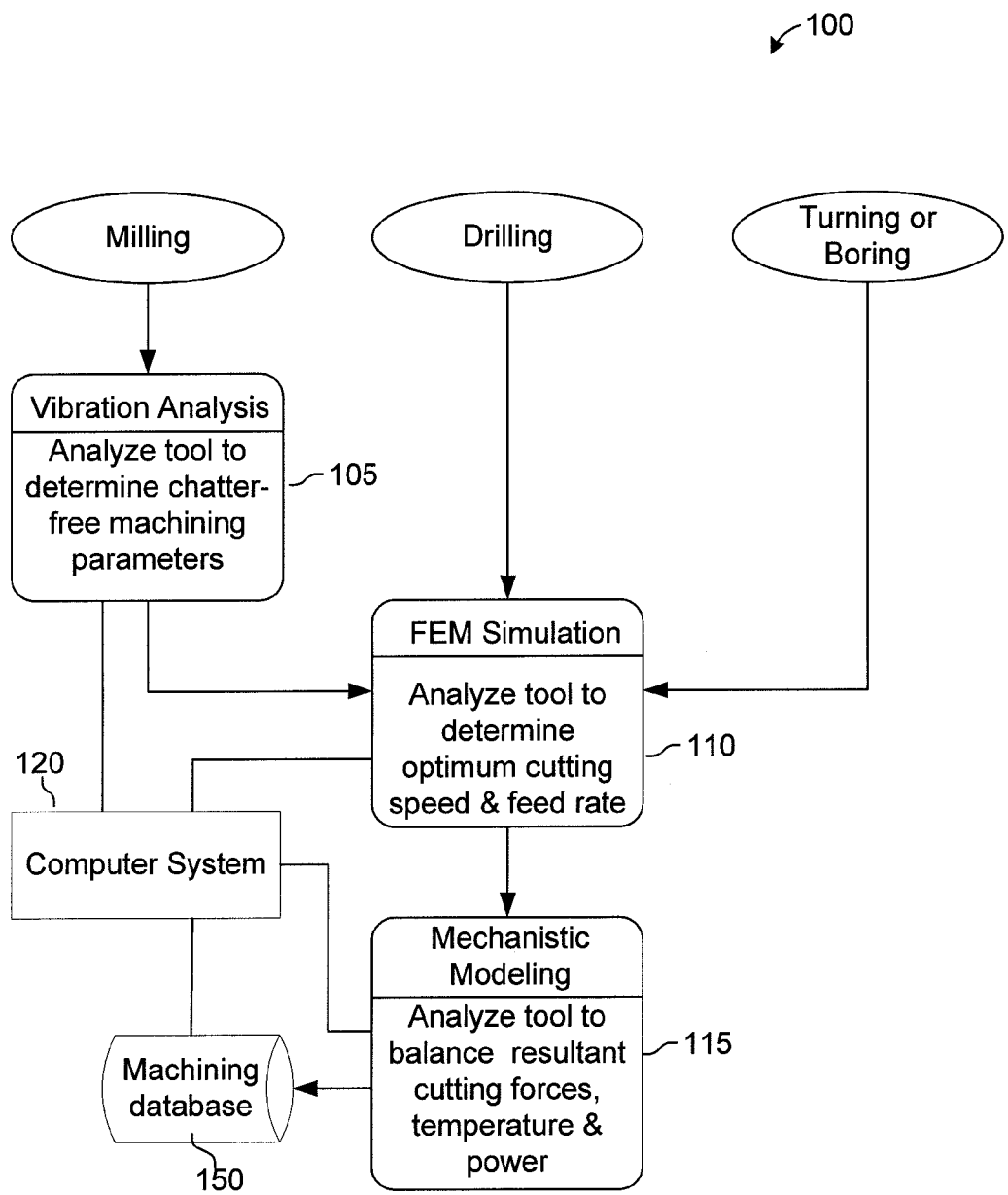
FIG. 1 is a flowchart showing an exemplary high level view of the present system and process.

The present system applies machining analysis techniques including finite element analysis, mechanistic modeling, and vibration analysis, individually or in combination, for analysis and optimization of various machining processes. FIG. 1 is a flowchart showing an exemplary high level view of the present system and process 100. As shown in FIG. 1, machining processes analyzed and optimized by the present system and method include milling, drilling, turning, and boring. The techniques employed by the present method assist in resolving machining issues such as low production rate, underutilized machine capacity, low tool life, tool vibrations or chatter, etc.

Analysis of a particular milling operation includes vibration analysis, described in detail below, as indicated by step 105. This analysis is performed using a set of software programs running on a computer system 120 to troubleshoot tool chatter issues and determine chatter-free machining parameters. Objectives of vibration analysis include an improved surface finish on a particular part, balancing of the forces on the machine tool, and enhancing the life of cutting tool. After vibration analysis is performed for the milling operation, process flow continues with finite element method analysis and mechanistic modeling, as described below.

Analysis of a drilling and turning/boring operations begins with finite element method (FEM) analysis. Parameters affecting machining processes include cutting forces and associated stresses on the cutting tools and in the machined work piece, temperature distribution in the tool and on the tool surfaces and the chip formation. Each of these parameters may be analyzed using finite element simulations to determine optimum cutting speed and feed rate, at step 110.

Compared to empirical and analytical methods, finite element method analysis has advantages in several respects. FEM analysis processes material properties as a function of strain, strain rate and temperature. Commercially available finite element analysis software is used to simulate machining processes. The analysis is conducted to evaluate the effect of changes in process parameters on the process outputs including cutting speed and cutting forces, peak tool temperature and estimated machine power requirement. Finite element software analyzes the process at a micro level and helps to optimize machining parameters and cutting tool life.

At step 115, commercially available mechanistic process modeling software is used to analyze the process at a macro level. The complete numerical control (NC) tool path is analyzed to balance the resulting cutting forces, temperature and power required to machine a particular part. Optimized machining parameters derived from these techniques are applied in a numerical control program and are documented in a database 150 (connected to computer 120) after successful implementation.

Machining database 150 is a knowledge base that is used to store the information on the tools, work piece material, set-up, operation, conventional and optimized machining parameters, and finite element analysis results from the simulation. Users can look-up optimized machining parameters for the machining conditions they are encountering and troubleshoot problems that may arise during the machining process. Data entry includes tool information, work material, machine information, machining parameters, and finite element analysis (FEM) results.

The tool information input to machining database 150 includes information related to tool holder assembly identification, manufacturer information, tool details such as material and geometry. The work information includes work material and grade, hardness, and raw stock type. The operation information includes set-up rigidity grading, operation type, type of cut. Set-up information includes machine number the tool is used on and whether it is a standard tool on the machine or not. Input data includes minimum and maximum conventional machining parameters as well as optimum machining parameters. Finite element analysis results include cutting force, thrust force, radial force, temperature, expected tool life, material/operation/machine information, machining parameters, and FEM results.

Optimization Methodology for Milling Operations

Figure 2A:
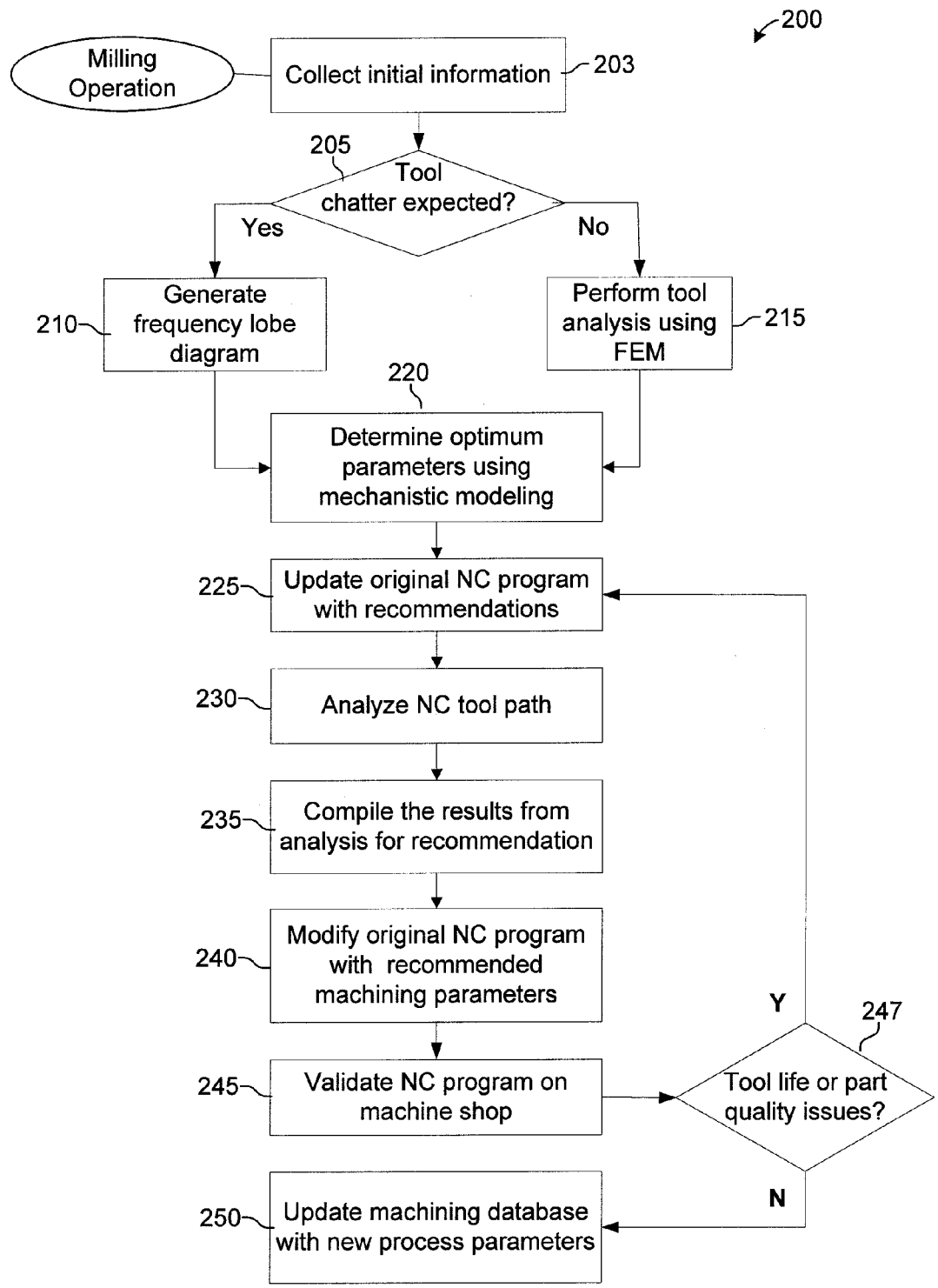
FIG. 2A is a flowchart showing an exemplary set of steps performed in analysis and optimization of a milling operation.

FIG. 2A is a flowchart showing an exemplary set of steps performed in analysis and optimization 200 of a milling operation. As shown in FIG. 2A, the present process for optimizing milling operations includes analysis of machining parameters, tool life, tool selection, and tool failure investigation. Information about milling machine spindle speed (RPM), feed rate, radial width of cut, axial depth of cut, work piece material grade, set-up rigidity, and cutting tool material, flute type, insert type, corner radius, and number of flutes, is initially collected at step 203. A selected tool is then checked for possibility of chatter or vibration during the machining operation at step 205. The criteria for the tool chatter test includes the predetermined value of tool length to diameter ratio, part feature characteristics, and fixture conditions. If the tool is expected to chatter, then it is analyzed to determine the chatter-free machining parameters using the frequency response of the cutting tool, spindle, and machine system.

Vibration analysis may be used to optimize and troubleshoot milling processes. A commercially available vibration analysis package, such as MetalMax, distributed by Technicut Ltd., includes vibration analysis software. The present system uses the predictive module of the analysis package. Using the predictive module, a static frequency response test is performed on the milling cutter by placing it in the stationary spindle of the machine.

Figure 2B:
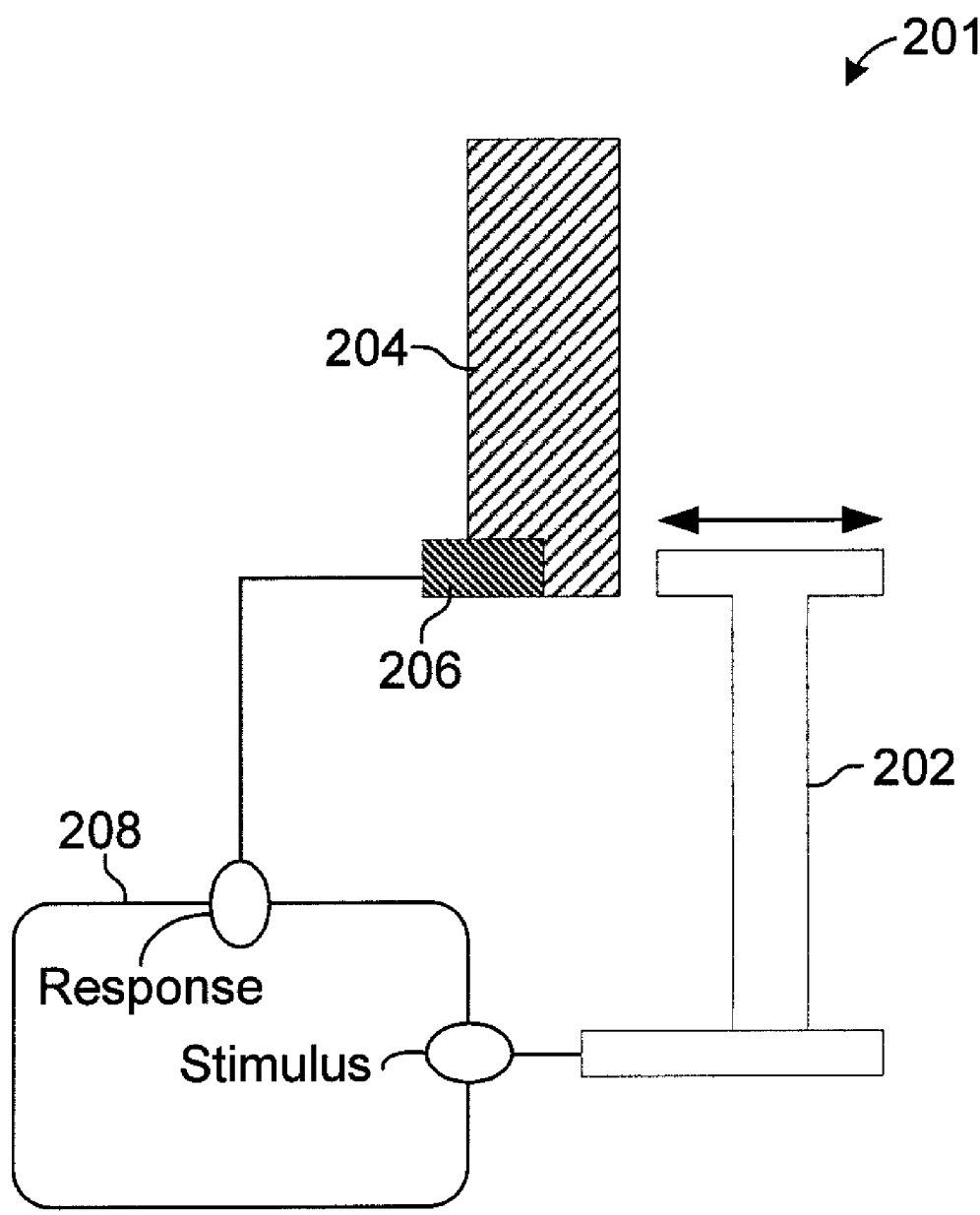
FIG. 2B is a diagram of a exemplary predictive configuration for performing vibration analysis.

FIG. 2B is a diagram of a exemplary configuration 201 for performing vibration analysis. As shown in FIG. 2B, analysis is conducted by a 'tap test' in which the milling cutter 204 is tapped using a test hammer 202 and the frequency response of the system is received through an accelerometer 206. The hammer 202 and accelerometer 206 are connected to a data acquisition/control unit 208.

As indicated in FIG. 2A, at step 210, a frequency lobe diagram is generated in accordance with the procedure described above, which allows determination of stable and unstable machine spindle speeds and depth of cuts. If tool chatter is not expected, then the tool is analyzed using FEM software, to determine optimum cutting speed and feed rate, in step 215.

Finite Element Analysis

To analyze milling operations, three-dimensional multi-point milling operations are simulated as two-dimensional single point turning operations to reduce the simulation time. Process parameters, such as cutting speed and feed rate, are converted from a multipoint cutting condition to a single point cutting condition. Two-dimensional turning and boring operations are simulated without any other changes in the actual process. Drilling operations are analyzed using a three dimensional process model.

The present machining process optimization involves analysis of baseline machining parameters for a tool/workpiece material combination using finite element simulation software such as AdvantEdge™, available from Third Wave Systems, Inc. The results of the baseline simulation provide a reference for optimization of the machining parameters. The baseline simulation is followed by a set of simulations performed via FEM by varying cutting speed and feed rate while maintaining constant depth of cut. The objective of these simulations is to determine machining parameters which provide high material removal rate while maintaining reasonable tool life.

The results of all the simulations, including cutting forces, peak tool temperature, tool stresses, tool pressure, and power consumption, are documented in a standard template. The results of baseline simulations are used to establish an acceptance limit for resulting cutting forces and peak tool temperature of the FEM simulations. The limits for peak tool temperature are also set by selection of the tool material. Machining parameters having results within acceptable limits are selected as optimized for machining. These optimized parameters are then used in the NC (numerical control) program which controls the milling machine and are validated by shop trials in the machine shop.

The results of the FEM analyses are combined to obtain optimum machining parameters in step 220. The original NC program is updated in step 225 by incorporating the optimized machining parameters obtained in step 220. The updated NC tool path is then analyzed for non-productive machining time, cutting forces, and temperature, using mechanistic modeling software, in step 230.

Mechanistic Modeling

A mechanistic modeling technique is used to analyze milling, drilling, turning and boring operations independently or in combination with FEM and vibration analysis. Commercially available mechanistic modeling software, such as Production Module™, available from Third Wave Systems, Inc., can be used for two-dimensional and three-dimensional simulations of the above-described machining processes. In contrast to FEM, mechanistic modeling provides a complete tool path can be analyzed for a series of operations by a cutter or set of cutters in sequential order. In this method, material properties are assigned to raw stock of the exact same shape and size as actual raw stock to be machined. A coordinate system is established to reflect the machine coordinate system, and geometric orientation of the raw stock is matched with that in the NC program, which is provided to the process simulation software. Mechanistic modeling is performed using information including work piece material properties, raw stock geometry, cutting tool details, and numerical control tool path. The shape of the final component is generated after completion of all the simulation operations. Results of the simulation include cutting forces, temperature, and machine power consumption, during machining of various features of the machined component or work piece. This data is analyzed to set an acceptance limit for the cutting forces and temperature. Machining parameters are altered to improve overall material removal rate within the bounds of cutting forces and temperature. The mechanistic modeling software identifies non-productive passes or motions of the cutter, which can be reduced or eliminated to improve overall machining time. The selected machining parameters are listed in a recommendation report. The machining process is analyzed and optimized to reduce the machining cycle time and to utilize the capacity of the cutting tool and machine tool to an optimum extent.

The analysis results of the mechanistic modeling procedure are compiled in step 235 to generate recommended optimized machining parameters to update the NC program. The NC program is updated in step 240 in accordance with the recommended parameters. After the NC program is modified, it is validated in the machine shop to evaluate the performance of the recommended tools using the optimized machining parameters, in step 245. If problematic issues related to tool life or part quality are experienced (step 247), then feedback is provided for further analysis, and the present process is repeated, continuing back at step 235. Finally, a machining database (knowledge base) 150 is updated with the optimized parameters for all the tools and corresponding machining conditions at step 250.

Optimization Methodology for Drilling Operations

Figure 3:
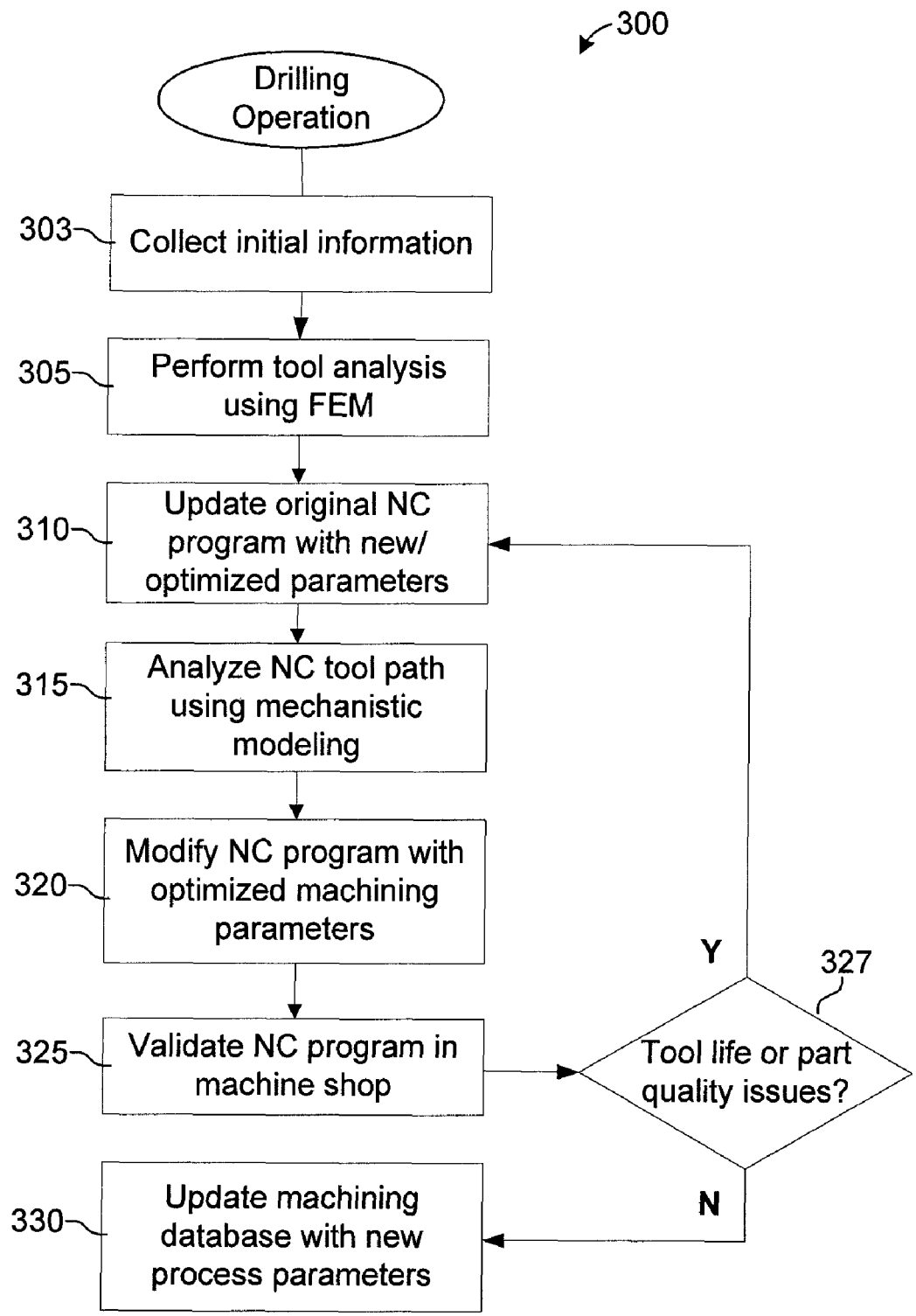
FIG. 3 is a flowchart showing an exemplary set of steps performed in analysis and optimization of a drilling operation.

FIG. 3 is a flowchart showing an exemplary set of steps performed in analysis and optimization 300 of a drilling operation. The present process for optimizing drilling operations includes analysis of machining parameters and tool life, tool selection, and tool failure investigation. Information about cutting tools, machine tool, work piece material grade and condition and set-up rigidity is collected in step 303 for analysis. An initially selected tool is analyzed using FEM software to determine optimum cutting speed and feed rate in step 305. The NC program for the drilling machine is updated in step 310 by incorporating the optimum machining parameters obtained in step 305. The updated NC tool path is then analyzed for the non-productive machining time, cutting forces, and temperature using mechanistic modeling software to determine optimized machining parameters, in step 315.

The NC program is updated with the optimized parameters in step 320. After the program is modified, it is validated in the machine shop to evaluate the performance of the recommended tools with optimized machining parameters, in step 325. If any problematic issues related to tool life or part quality are experienced (step 327), then feedback is provided for further analysis, modified parameters are determined, and the present process is repeated, continuing back at step 310. Finally, the machining database 150 is updated with the optimized parameters for the tools and corresponding machining conditions at step 330.

Optimization Methodology for Turning and Boring Operations

Figure 4:
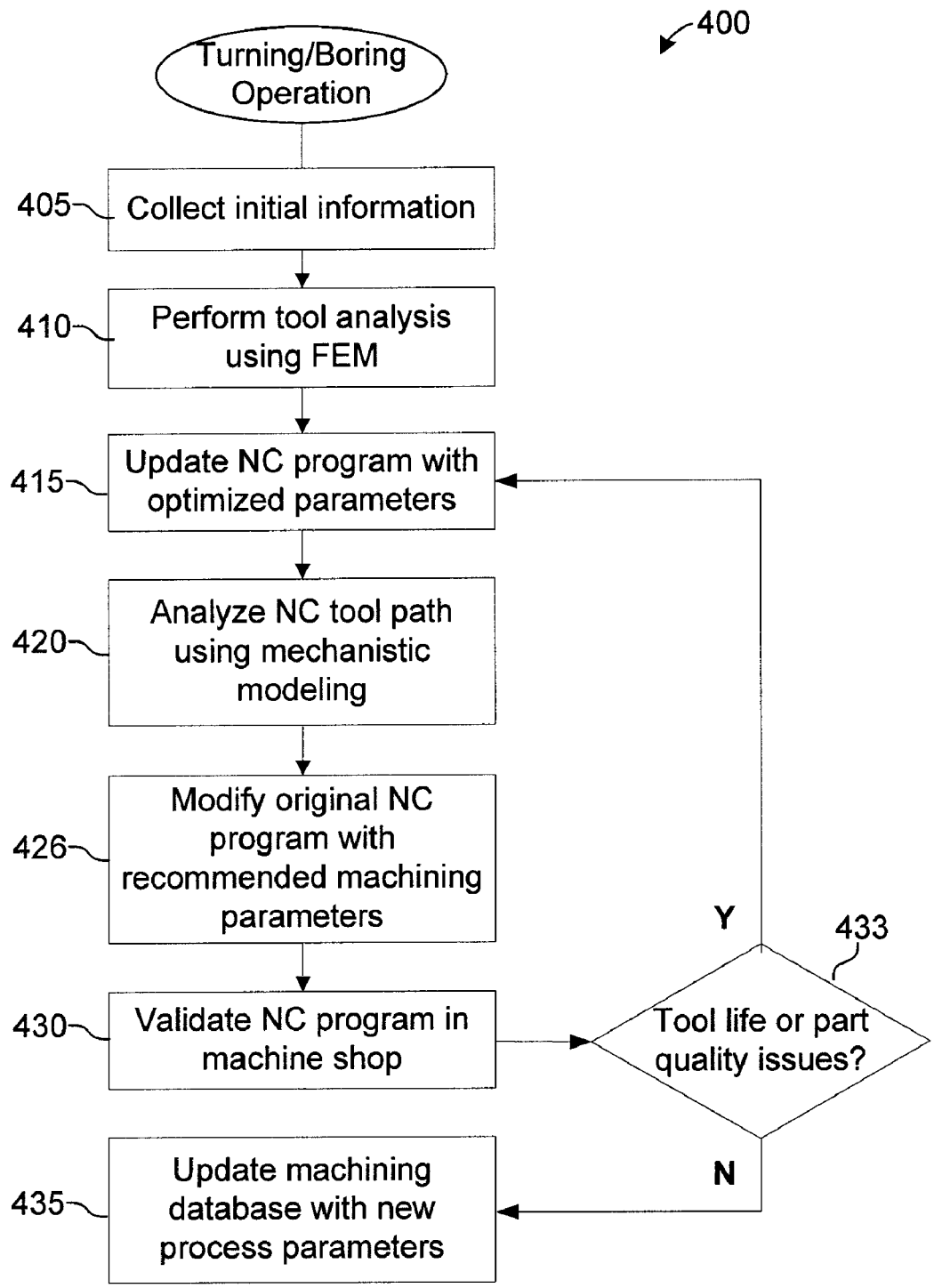
FIG. 4 is a flowchart showing an exemplary set of steps performed in analysis and optimization of a turning/boring operation.

FIG. 4 is a flowchart showing an exemplary set of steps performed in analysis and optimization 400 of a turning/boring operation. The present process for optimizing turning and boring operations includes analysis of machining parameters and tool life, tool selection, and tool failure investigation. Information about cutting tools, machine tool, work piece material grade and condition and set-up rigidity is collected in step 405 for analysis. A selected tool is then analyzed using FEM software to determine optimum cutting speed and feed rate in step 410. The NC program for the turning/boring machine is updated in step 415 by incorporating the optimum machining parameters obtained in step 410. The updated NC program is analyzed for the non-productive machining time and cutting forces using the mechanistic modeling software in step 420.

The NC program is updated in step 425 using the determined optimized machining parameters including surface speed, feed per revolution and depth of cut. After the NC program is modified, it is validated in the machine shop to evaluate the performance of the recommended tools at optimum machining parameters, in step 430. If any problematic issues related to tool life or part quality are experienced (step 433), then feedback is provided for further analysis, modified parameters are determined, and the present process is repeated, continuing back at step 415. Finally the machining database 150 is updated with the optimized parameters for the tools and corresponding machining conditions at step 435.

Machining Process Analysis Automation Using Artificial Neural Networks

In an alternative embodiment, a machining process optimization technique using finite element modeling (FEM) software may be used to reduce machining time, to increase tool life, to improve productivity and to optimize machine tool utilization. However, this technique requires a significant amount of analysis time to perform FEM simulations and to determine optimum machining parameters.

Optimization of Machining parameters is a non-linear process with constraints on allowable cutting temperature and cutting forces. There are complex inter-relationships between machining parameters and their collective effect on mechanics of machining. The use of Artificial Neural Networks (ANNs) for machining process optimization is one approach for automatic modeling of dynamic, non-linear phenomena that are too complex to be solved by conventional optimization algorithms. This methodology ensures efficient and relatively fast selection of the optimum machining parameters from an available set of pre-analyzed reference parameters including work material properties, machining parameters and cutting tool geometry.

Machining process optimization involves analysis of baseline simulation of machining operations with conventional machining parameters using a two-dimensional finite element method. The baseline simulation is followed by FEM simulations in which cutting speed and feed rate are varied to determine improved material removal rate and reasonable cutting tool life. Depth of cut is kept constant for all of the simulations. The results of all the simulations are recorded in terms of cutting forces and peak tool temperature. The results of baseline simulations are used to establish acceptance limits for cutting forces and peak tool temperature.

Machining parameters having results within the acceptable limits are selected for recommendation. In order to shorten the analysis time involved in this optimization procedure, automatic optimization methodology of machining parameters using a two-stage ANN for each cutting tool and work piece material combination is employed in the present method.

Compared to conventional computing methods, neural networks are more robust and generally better suited for analyzing complex sets of information. Neural networks can be used to solve many nonlinear optimization problems and work on the basis of feed-forward and back-propagation algorithms which automatically adapt to current conditions during training. The starting point for the use of a neural network is representative data collected from finite element simulation results through FEM simulations. In an exemplary embodiment, ANN analysis is performed in steps 215 (FIG. 2A), 305 (FIG. 3), and 410 (FIG. 4) of the above-described embodiments.

Numerous FEM simulations are performed for different materials and conditions by selecting values for inputs including tool geometry and machining parameters within specified maximum and minimum limits. Outputs of these simulations are used for training and testing of Neural Networks.

Neural networks are trained using the simulation results of a matrix of machining parameters. Network training involves the process of interactively adjusting weights across the connections of the network with the help of a back-propagation algorithm in such a way that the prediction errors on the training set are minimized.

Once the training is completed, testing of the network is done with a set of simulation results (not used for network training) to validate the outcome of neural network from supervised learning. If the testing is successful and the error of prediction is within permissible limits, then the empirical network model is fine-tuned and made ready for use through a user interface.

Once the training and testing are successfully completed, the empirical model 500 can be used to predict the results of two-dimensional machining, namely, peak tool temperature, X-cutting force and Y-cutting force for the given cutting speed, feed per tooth and rake angle as input parameters.

Figure 5:
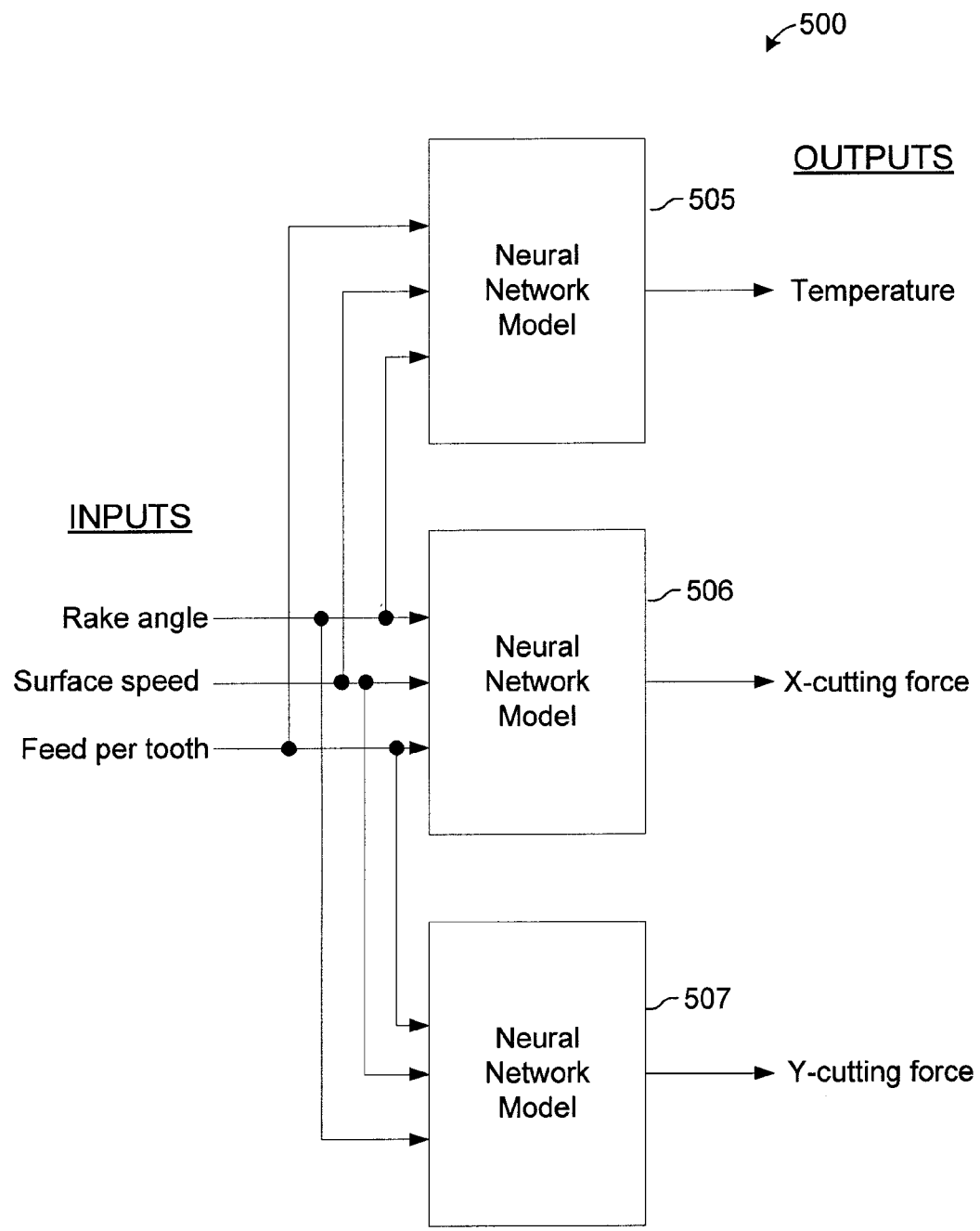
FIG. 5 is a diagram of a exemplary first-stage Artificial Neural Network model for predicting the results of a machining operation.

FIG. 5 is a diagram of a exemplary first-stage artificial neural network 500 for predicting the results of a machining operation using finite element analysis of machining and tool geometry input parameters. As shown in FIG. 5, information including tool rake angle, material cutting (surface) speed, and feed per (cutting tool) tooth is input to each of three neural network models 505, 506, and 507. These models respectively provide values for work surface/tool temperature, X-plane cutting force, and Y-plane cutting force.

Using the empirical model 500 shown in FIG. 5, FEM simulations are performed for different materials and conditions by selecting values for inputs including tool geometry (e.g., rake angle) and machining parameters (e.g., cutting speed and feed rate) between specified maximum and minimum limits.

Figure 6:
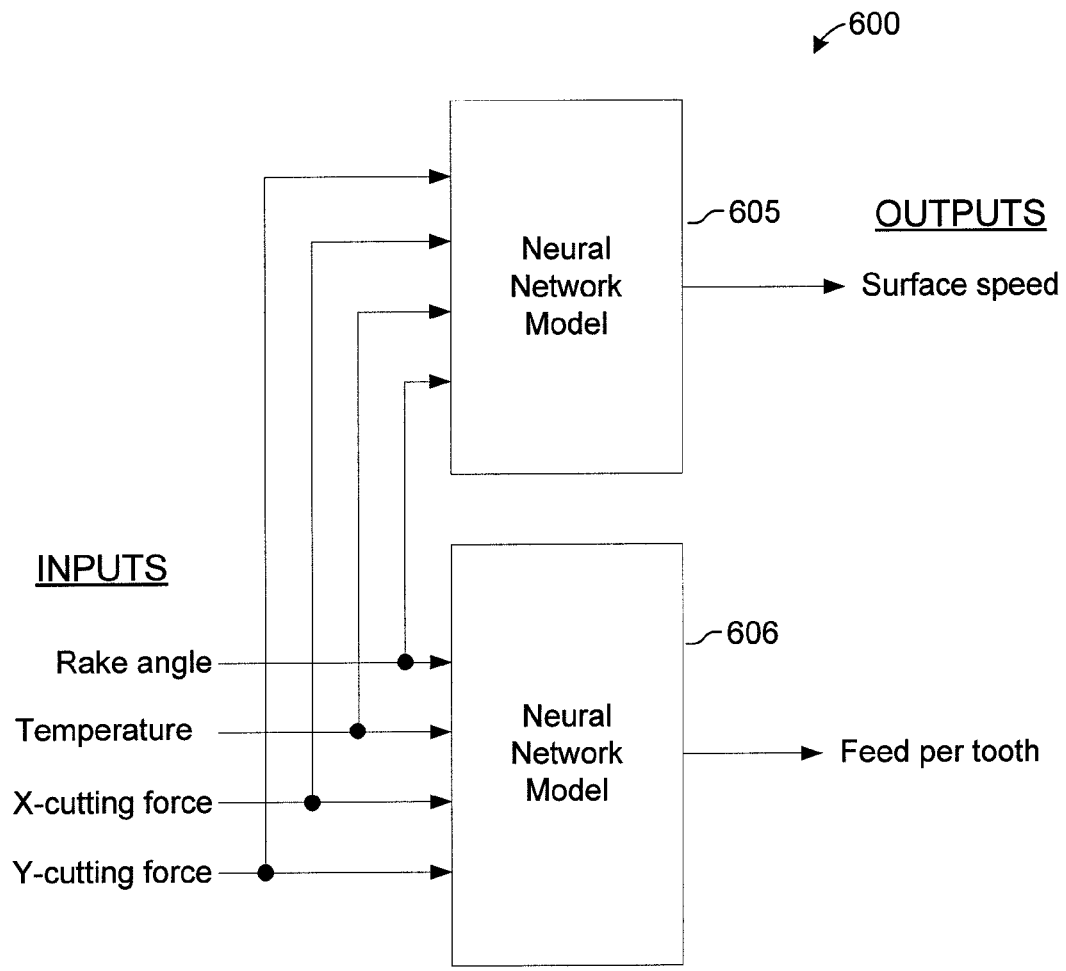
FIG. 6 is a diagram of a exemplary first-stage Artificial Neural Network model for predicting the results of a machining operation.

FIG. 6 is an exemplary diagram showing an artificial neural network system 600 used for continued finite element analysis of the machining process and tool geometry input parameters. FIGS. 5 and 6 collectively comprise a two-stage artificial neural network 500/600. The results thus obtained from this model 500 are regarded as baseline results and allowable limits (e.g., within 110% of baseline results) are given as input parameters to a second empirical model, which is the second-stage artificial neural network 600 shown in FIG. 6, As shown in FIG. 6, output values from artificial neural network 500 including tool rake angle, temperature, and X- and Y-cutting force, are input to each of two neural network models 605 and 606. Optimized values of surface speed and feed per tooth are obtained as output parameters from the second-stage ANN model 600 for improved material removal rate and reliable tool life.

While preferred embodiments of the present method have been described, so as to enable one of skill in the art to practice the disclosed subject matter, the preceding description is intended to be exemplary only, and should not be used to limit the scope of the disclosure, which should be determined by reference to the following claims.

What is claimed is:

1. A method for optimizing machining parameters for a milling process performed on a work piece using a cutting tool, the method comprising:

performing finite element analysis of cutting tool and work material interaction to determine an optimized combination of the machining parameters by varying work material properties, cutting tool geometry, cutting speed and feed rate;

performing mechanistic modeling of the milling process, using results of the finite element analysis, to provide optimized machining parameters for improved rate of material removal and tool life;

using a two-stage artificial neural network, wherein a first stage of the network provides output parameters including peak tool temperature and cutting forces in X and Y directions, for a combination of input reference parameters including tool rake angle, material cutting speed, and feed rate;

wherein the output parameters obtained from the first stage are considered to be baseline parameters;

applying acceptance criteria to the baseline parameters determine acceptable baseline parameters;

using the acceptable baseline parameters as input to a second stage of the network;

obtaining optimized values of machining parameters, including surface speed and feed rate, from the second stage of the network; and utilizing the optimized values to improve work piece material removal rate and cutting tool life.

2. The method of claim 1, wherein resonance-based vibration analysis is performed prior to the finite element analysis and the mechanistic modeling, by analyzing cutting tool operation to determine machining parameters which result in reduced tool chatter.

3. The method of claim 2, wherein the optimized combination of machining parameters include parameters selected from the set consisting of work piece material grade, set-up rigidity, cutting tool material, flute type, insert type, corner radius, and number of flutes.

4. The method of claim 1, wherein:

the finite element analysis is performed by simulating operation of the cutting tool to determine the optimized cutting speed and feed rate; and the mechanistic modeling is performed by analyzing operation of the cutting tool to balance resultant cutting forces, temperature, and milling machine power.

5. The method of claim 1, wherein the finite element analysis is performed using information including parameters selected from the set consisting of machining parameters, work material properties and cutting tool details, to provide a prediction of parameters selected from the group consisting of cutting forces, tool temperature, tool stresses, tool pressure, and milling machine power consumption, resulting from machining the work piece.

6. The method of claim 5, wherein the finite element analysis is performed by varying cutting speed and feed rate while maintaining constant depth of cut.

7. The method of claim 1 wherein the mechanistic modeling is performed using parameters selected from the set consisting of work piece material properties, raw stock geometry, cutting tool details, and numerical control tool path to provide a prediction of cutting force, tool temperature, and milling machine power consumption, resulting from machining various features of the work piece.

8. A method for optimizing machining parameters for a turning process performed on a work piece using a cutting tool, the method comprising:
- performing finite element analysis of cutting tool and work material interaction to determine an optimized combination of the machining parameters, using a finite element model, by varying work material properties, cutting tool geometry, cutting speed and feed per tooth;
- performing mechanistic modeling of the turning process, using results of the finite element analysis, to provide optimized machining parameters for improved rate of material removal and tool life;
- using a two-stage artificial neural network, wherein a first stage of the network provides output parameters including peak tool temperature and cutting forces in X and Y directions, for a combination of input reference parameters including tool rake angle, material cutting speed, and feed per tooth;
- wherein the output parameters obtained from the first stage are considered to be baseline parameters;
- applying acceptance criteria to the baseline parameters determine acceptable baseline parameters;
- using the acceptable baseline parameters as input to a second stage of the network;
- obtaining optimized values of machining parameters, including surface speed and feed per tooth, from the second stage of the network; and
- utilizing the optimized values to improve work piece material removal rate and cutting tool life.

9. The method of claim 8, wherein the parameters to be optimized are selected from the set consisting of surface speed, feed rate, depth of cut, tool material, holder types, and insert types.

10. The method of claim 8, wherein:
- the finite element analysis is performed by simulating operation of the cutting tool to determine the optimized cutting speed and feed rate; and
- the mechanistic modeling is performed by analyzing operation of the cutting tool to balance resultant cutting forces, temperature, and turning machine power.

11. The method of claim 8, wherein the finite element analysis is performed using information including parameters selected from the set consisting of machining parameters, work material properties and cutting tool details, to provide a prediction of parameters selected from the group consisting of cutting forces, tool temperature, tool stresses, tool pressure, and turning machine power consumption, resulting from machining the work piece.

12. The method of claim 11, wherein the finite element analysis is performed by varying cutting speed and feed rate while maintaining constant depth of cut.

13. The method of claim 8 wherein the mechanistic modeling is performed using parameters selected from the set consisting of work piece material properties, raw stock geometry, cutting tool details, and numerical control tool path to provide a prediction of cutting force, tool temperature, and turning machine power consumption, resulting from machining various features of the work piece.

14. A method for optimizing machining parameters for a cutting process performed on a work piece using a cutting tool, the method comprising:
- performing finite element analysis of cutting tool and work material interaction;
- performing mechanistic modeling and analysis of the cutting process, using results of the finite element analysis, to provide machining parameters for an improved rate of material removal and tool life;
- determining an optimized combination of the machining parameters, using a finite element model, by varying work material properties, cutting tool geometry, cutting speed and feed rate;
- using a two-stage artificial neural network, wherein a first stage of the network provides output parameters including peak tool temperature and cutting forces in X and Y directions, for a combination of input reference parameters including tool rake angle, material cutting speed, and feed rate;
- wherein the output parameters obtained from the first stage are considered to be baseline parameters;
- applying acceptance criteria to the baseline parameters determine acceptable baseline parameters;
- using the acceptable baseline parameters as input to a second stage of the network;
- obtaining optimized values of machining parameters, including surface speed and feed rate, from the second stage of the network; and
- utilizing the optimized values to improve work piece material removal rate and cutting tool life.

* * * * *